US009600017B2

(12) United States Patent
Van Saanen

(10) Patent No.: US 9,600,017 B2
(45) Date of Patent: Mar. 21, 2017

(54) VEHICLE THROTTLE AND BRAKE CONTROL SYSTEM EMPLOYING INSTINCTIVE DRIVER RESPONSE FOR ENHANCED VEHICLE CONTROL

(71) Applicant: Victor Van Saanen, Spring Valley, CA (US)

(72) Inventor: Victor Van Saanen, Spring Valley, CA (US)

( * ) Notice: Subject to any disclaimer, the term of this patent is extended or adjusted under 35 U.S.C. 154(b) by 0 days.

(21) Appl. No.: 14/609,086

(22) Filed: Jan. 29, 2015

(65) Prior Publication Data

US 2015/0142290 A1 May 21, 2015

Related U.S. Application Data

(63) Continuation-in-part of application No. 13/226,430, filed on Sep. 6, 2011.

(60) Provisional application No. 61/402,857, filed on Sep. 7, 2010.

(51) Int. Cl.
| | | |
|---|---|---|
| *G06F 7/70* | (2006.01) | |
| *G06F 19/00* | (2011.01) | |
| *G06G 7/76* | (2006.01) | |
| *G05G 1/32* | (2008.04) | |
| *G05G 1/38* | (2008.04) | |

(52) U.S. Cl.
CPC .............. *G05G 1/32* (2013.01); *G05G 1/38* (2013.01); *Y10T 74/20189* (2015.01); *Y10T 74/20534* (2015.01)

(58) Field of Classification Search
USPC ........................................................ 180/275
See application file for complete search history.

(56) References Cited

U.S. PATENT DOCUMENTS

| | | | | |
|---|---|---|---|---|
| 3,183,995 A | * | 5/1965 | Schultz ................. | B60K 26/02 180/335 |
| 3,208,566 A | * | 9/1965 | Fukuda ................. | B60K 41/20 477/210 |
| 3,409,101 A | * | 11/1968 | Williams .............. | B60K 28/06 180/271 |
| 5,193,640 A | * | 3/1993 | Lee ....................... | B60K 26/00 180/271 |
| 5,599,255 A | * | 2/1997 | Ki-Dong ............... | B60K 41/20 477/211 |
| 5,957,811 A | * | 9/1999 | Gustafsson ........... | B60K 26/02 29/401.1 |
| 6,407,526 B1 | * | 6/2002 | Black, III ............. | B60K 26/02 310/75 B |
| 6,595,082 B2 | * | 7/2003 | Liimatta ............... | G05G 1/405 74/512 |

(Continued)

*Primary Examiner* — Bhavesh V Amin
(74) *Attorney, Agent, or Firm* — Donn K. Harms

(57) ABSTRACT

An improved motor vehicle speed and braking control system configured to maximize performance and response times for braking to a driver's instinctual physiological and psychological response to a perceived need to decelerate. The system provides a throttle pedal and brake pedal system configured to cause braking and an immediate change of engine power to idle once a user touches or causes activation of safety switches by a proximity or contact with them directly or with the brake pedal or a sliding of the throttle pedal depending on the configuration. Accidental acceleration during any attempt to brake is thereby eliminated by the system.

8 Claims, 12 Drawing Sheets

(56) References Cited

U.S. PATENT DOCUMENTS

| | | | |
|---|---|---|---|
| 6,919,801 B2* | 7/2005 | Kim .................. | B60W 10/06 180/282 |
| 7,909,735 B1* | 3/2011 | Kuskie ............... | B60W 50/10 477/187 |
| 8,255,121 B2* | 8/2012 | Zagorski ............ | B60W 50/10 701/301 |
| 8,775,046 B2* | 7/2014 | Kaster ............... | B60T 7/042 303/113.1 |
| 2005/0075777 A1* | 4/2005 | Kim .................. | B60W 10/06 701/70 |
| 2007/0034440 A1* | 2/2007 | Zomotor ............ | B60K 28/02 180/275 |

\* cited by examiner

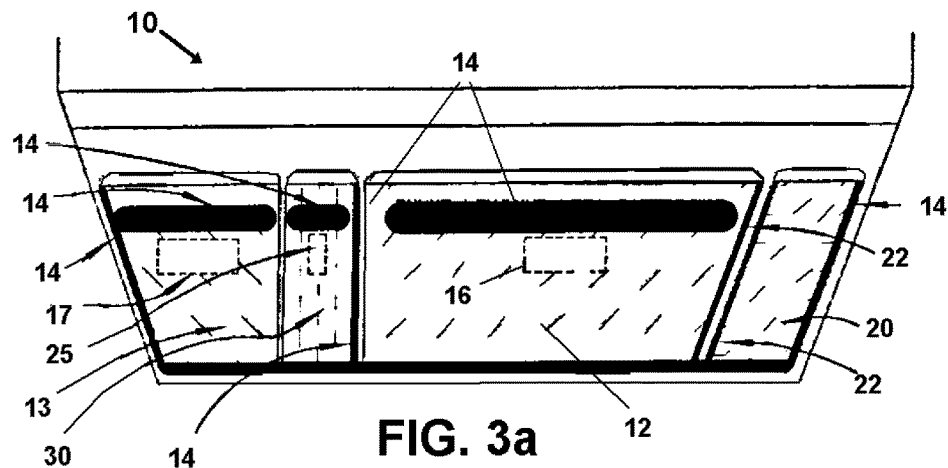
FIG. 3a
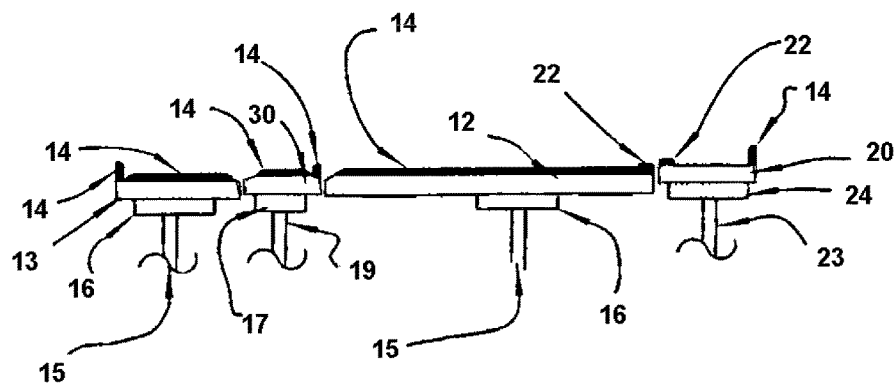
FIG. 3b
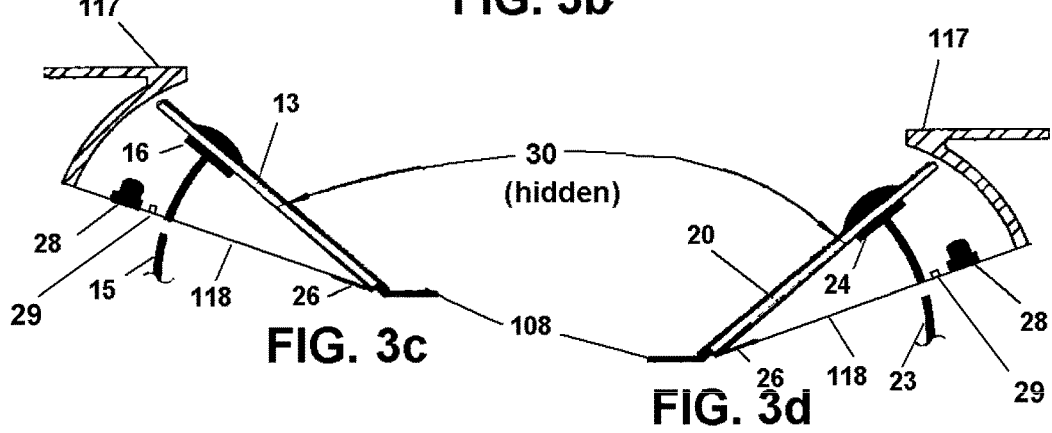
FIG. 3c
FIG. 3d

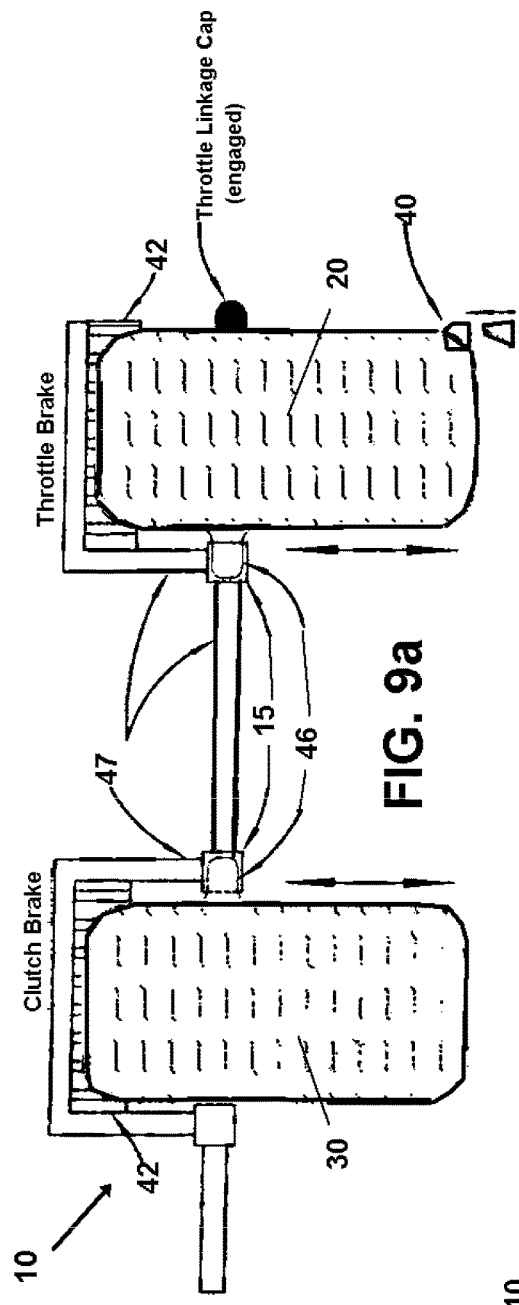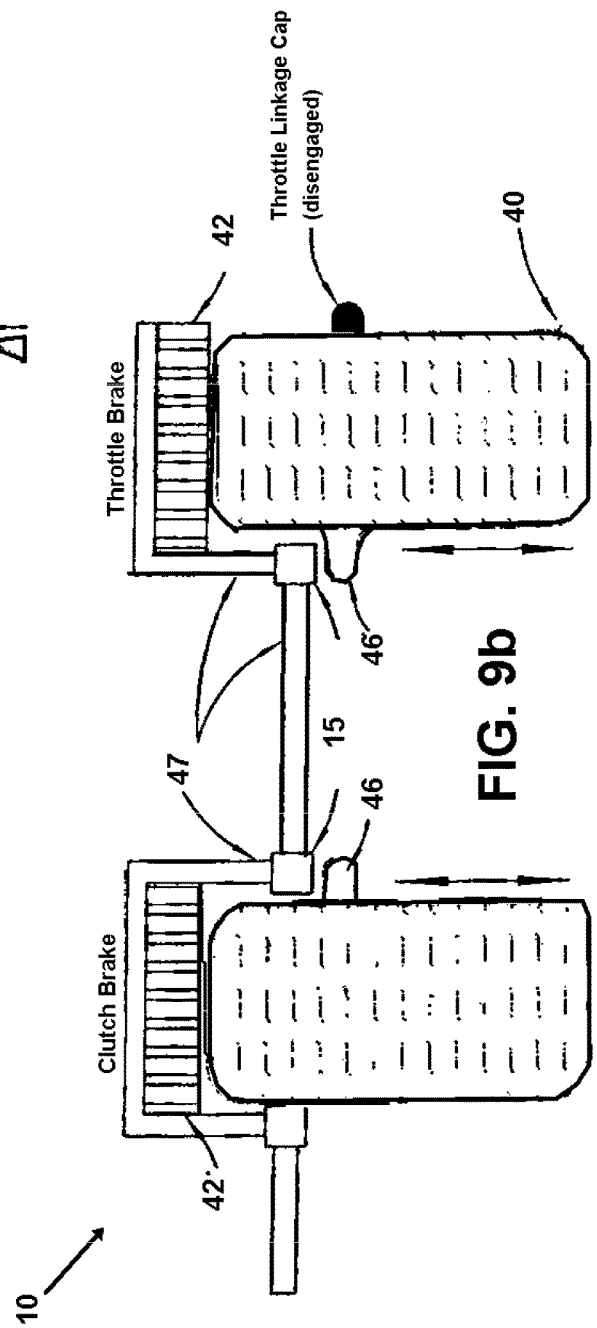

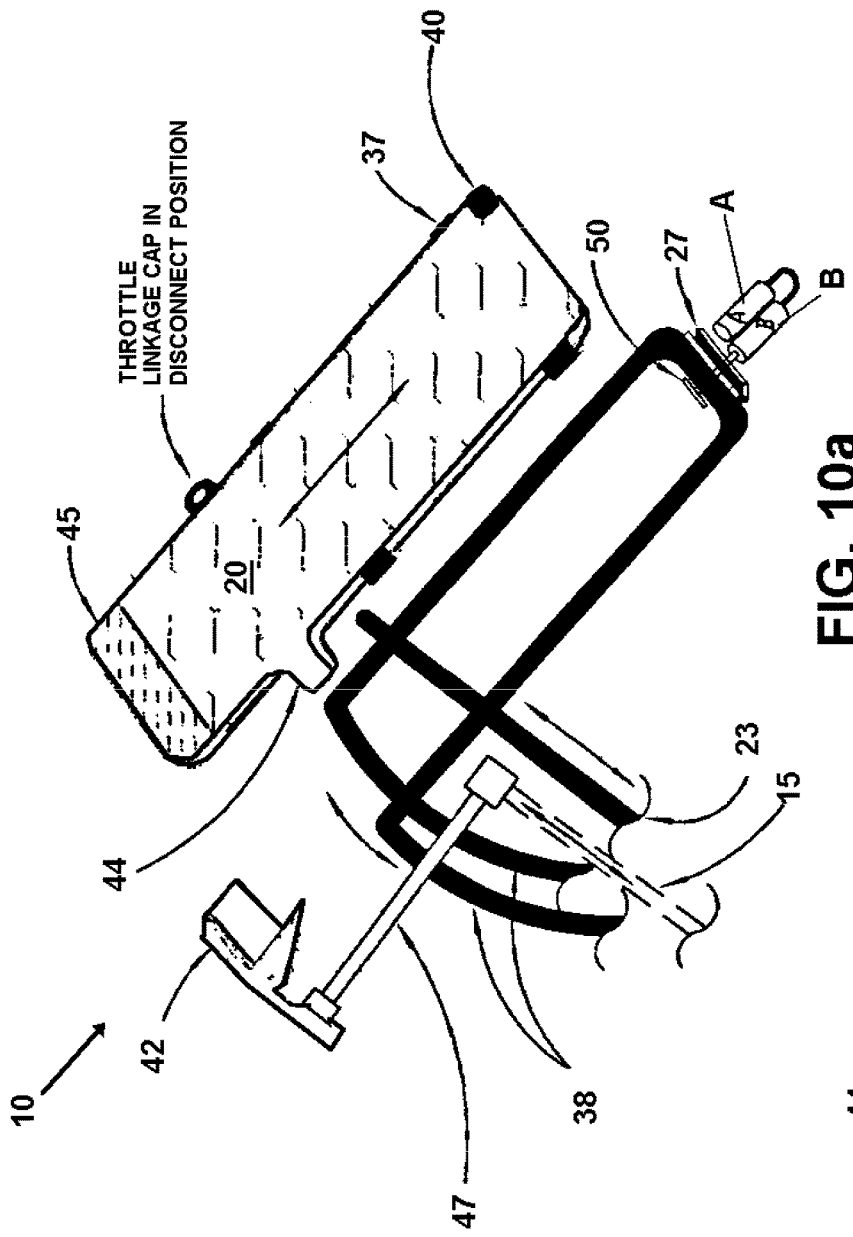
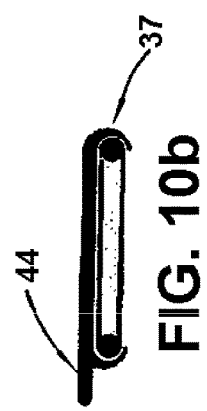
FIG. 10a
FIG. 10b

VEHICLE THROTTLE AND BRAKE CONTROL SYSTEM EMPLOYING INSTINCTIVE DRIVER RESPONSE FOR ENHANCED VEHICLE CONTROL

This application is a Continuation-in-Part of U.S. Non-Provisional application Ser. No. 13/226,430 filed on Sep. 6, 2011, which claims priority to U.S. Provisional Application Ser. No. 61/402,857 filed on Sep. 7, 2010, both incorporated herein in their respective entirety by reference.

BACKGROUND OF THE INVENTION

1. Field of the Invention

The present invention relates generally to systems and methods designed to reduce the dangers presented by intentional and unintentional actions by drivers employing pedals for vehicle acceleration and braking. More particularly, it relates to an improved design and configuration of foot control areas of present motor vehicles, such that it takes advantage of a driver's natural and instinctual physiological and psychological response in rapidly changing traffic conditions, to achieve quicker and more accurate pedal control and employment. In addition, the device relates to the implementation of electronic sensing means communicating with software adapted at the task of determining occurrences of incorrect acceleration and other driver related errors to provide automatic braking and/or throttle lockout.

2. Prior Art

Motor vehicle crashes are the leading cause of injury and death in America. The National Safety Council (NSC) estimates that several specific driver behaviors and errors contribute to ninety percent (90%) of all motor vehicle crashes. Crashes caused solely by vehicle or external factors (e.g., the failure of one or more vehicle components or road or weather conditions) account for the other ten percent (10%) of vehicle crashes.

At its most basic level, driving requires that a driver have the adequate mental and physical abilities of sight, hearing and feeling, the mental and physical ability to correctly interpret the proper reaction to what is being seen, heard and felt, and the necessary mental and physical condition to carry out the correct reaction. These abilities will of course change at different rates for different people as they get older. Not surprisingly, teenage drivers, who must learn new skills needed for driving and who frequently engage in high-risk behaviors, such as speeding and/or driving after using alcohol or drugs, have the highest fatality rate from motor vehicle crashes of all age groups, followed closely, based on miles driven, by drivers 65 years old and older. People 65 and older are the fastest growing demographic in the U.S., and by 2030, a quarter of all licensed drivers in the United States will be in that age group.

Age alone, however, is not a reliable indicator of driving ability. Some people in their 90s and beyond are more healthy and fit for driving than many people half their age. Still, as a general rule, it can be said that the older a person gets, the bigger the risk he or she tends to pose as a safe driver. As the over-65 population grows, more elderly people will be driving more miles and more frequently. A fact which has led the National Highway Traffic Safety Administration (NHTSA) to predict that the number of elderly driver traffic fatalities in the U.S. could triple by 2030.

One phenomena that afflicts young and old drivers alike is a driver response known as "pedal error" or as an unintentional acceleration while attempting to brake the vehicle. A third type of driver could be added to the list of those afflicted if one were to consider an experienced driver, who for the first time, is starting a different and unfamiliar car in which he or she has had absolutely no experience.

It must be noted that in this present application the term 'pedal error' is to be defined to include any misuse of a motor vehicle's foot controls, such as hitting the accelerator when intending to hit the brake, a sensing of impending misuse of vehicle's foot controls, slipping from the brake to the accelerator, or similar occurrences where the driver is not intending to press the accelerator but does so. In addition, the term further is employed with persons prone to pedal error type conditions, for instance drivers operating under especially stressful conditions, such as any driver with very little affinity for, or understanding of, mechanical systems, and their often complex procedures.

There has been little public notice of pedal error until two horrendous accidents. Once such occurrence was in Santa Monica, Calif. in 2003. A second occurrence was in San Diego County, Calif. in 2009. Both incidents made headlines nationally and even world wide.

In the Santa Monica incident, during an open-field farmer's market in Santa Monica attended by hundreds of patrons, an 86 year old man, while looking for a parking spot, attempted to stop for a pedestrian. However, when he stepped on the throttle instead of the brake, and the car wouldn't stop, he continued his mistake by continuously pumping the gas pedal which he thought was his brake. During the Santa Monica incident, the car proceeded through the market for approximately 2 blocks (750 feet), traveling as fast as 70 mph before coming to a stop when the vehicle finally landed in a ditch. As a result, 11 people were killed and 63 were injured, many critically so.

In the San Diego County incident, a highly experienced California Highway Patrolman, was off duty and traveling with members of his family. This driver was driving a newer Lexus vehicle which had been loaned to him from a dealer and he was as such unfamiliar with the vehicle. While the vehicle was being driven on the highway, an emergency telephone call was placed from a passenger sitting in the rear of the vehicle. The passenger was screaming repeatedly that the throttle was jammed on the vehicle and the car had accelerated to 100 miles per hour when suddenly the telephone call ceased.

Later it was found that the car had approached an intersection at a high rate of speed and missed the turn and gone airborn for at least 150 feet before landing and bursting into flames. The driver and his family were all killed in the crash.

The San Diego incident shows that even a highly experienced police officer, who would normally drive safely with his family in the car, can be so unfamiliar with a vehicle as to lose control.

In both the Santa Monica and San Diego crashes, if the present invention had been installed in the vehicles, the accidents would have been prevented. While one accident was a mistake by an elderly driver and the other a mistake of a highly trained driver, the common problem was faulty pedal designs of conventional vehicles. Such faulty designs continue to cause accidents. Further, current throttle and brake systems to do employ electronically-activated or mechanically actuated means for automatic braking and/or throttle lockout during accidental or incorrect throttle usage.

Both the Santa Monica and San Diego accidents are examples of conventional "pedal error". Because of the national and even world wide attention these two events gained, they received intensive review by the NTSB, (National Transportation Safety Board) in the United States which discerned that pedal error was the root cause.

Thousands of pedal errors are made all over the U.S. every year and little publicity was given them if only one or two fatalities occurred. Further, without living and reliable witnesses to recount the event, there is little possibility the actual cause of such crashes are properly identified as pedal error. The number of pedal error type fatalities which are misidentified every year is estimated in the hundreds of thousands worldwide.

There has been identified what is believed as four types of drivers that are associated with an increased probability of improper foot control usage, including the unintentional and mistaken use of throttle instead of brake referred to as "pedal error". It happens more frequently to senior citizens, to young drivers just learning to drive, to people who are driving an unfamiliar car, and to those drivers who have little affinity for, or understanding of, mechanical systems and procedures.

The problems experienced with senior drivers, new drivers, and driving an unfamiliar car are almost self-explanatory. Drivers with little affinity or understanding of mechanical systems and procedures are another matter entirely and may require considerable sensitive thought to understand. Experience has shown that those who are very mechanically inclined are able to easily overcome any system or procedure that is not exactly logical and correct, or which may be unnecessarily difficult to understand and operate. Such persons are naturally oriented to details and particulars. If there is something wrong in the process, they will simply overcome the difficulty and accomplish control.

However, those who are not at all mechanically inclined, tend to consider such detailed systems and procedures from a very universal and overall point of view. They don't understand the detailed process as much as the overall result. The question their mind will posse is, "what is the total human value of the process; is the overall process easy, simple and correct". If it is not, they usually don't understand why; they just have a strong intuitive perception that something is not right.

Such perception often leads to confusion and a hesitation to act correctly during emergency type situations. It will usually also be noticed that this type of person will never seem completely relaxed behind the wheel, sitting at attention with both hands on the wheel and staring straight ahead at traffic. It is this type of driver that has lead the inventor to discover a very serious, long standing flaw in the design of the foot control system of motor vehicles and has invented a correction to such flaw.

This most serious flaw in the design of motor vehicle foot controls that has existed since the very beginning of automotive construction, forces a driver during emergency type situations, to perform a maneuver which is inherently awkward. Further, it is time consuming and the exact opposite of the normal and instinctual human response in such situations. Still further, until the conception of the current invention, there has been no incorporation of means for field proximity or motion sensing of the controls of the brake and throttle systems for providing electronic or mechanical means for automatic braking and throttle lockout (i.e. rendering the vehicle unable to provide acceleration) in vehicle design, but for the direct control by the driver which as noted can be flawed.

The two most important functions in the safe control of an automobile are both directional control and speed control. Any misuse of directional control (steerage) will obviously have a negative effect on speed control. By the same token, any misuse of speed control by using throttle or the brake can result in a negative effect on steering, as well as a resulting accident from acceleration.

With regard to speed, the brake is of greatest importance. It is absolutely imperative that immediate braking be applied to slow the vehicle any time when necessary. There is seldom however, any need for immediate emergency acceleration. However, immediate or instantaneous braking using conventional controls is impossible. This is because conventionally in cars and trucks, the right foot of the driver is employed to control both the brake and throttle. From a time standpoint, the driver's right foot is most often riding the throttle pedal. Because study has shown that it takes at least one and one-half to two seconds for the driver to move their foot from throttle to brake, instantaneous braking while the vehicle is moving during emergency situations happens far too late. During the lag caused by foot-transfer from throttle to brake, the vehicle can travel a large distance at high speeds. This is why many race car drivers employ one foot for the throttle and the other for braking. Since they do not have to transfer from one pedal to the other at high speeds, they have continuous control and instantaneous braking when needed.

As noted, the right foot pressing on the throttle pedal is incapable of applying instantaneous braking as it takes a minimum of one and one-half to two seconds for the right foot to go from throttle pedal to brake pedal in conventional vehicle designs. This is because it takes four steps for a driver to apply braking. First, they take pressure from their foot to reduce throttle to idle. Next they must raise the right foot above the throttle pedal. In a third action, the driver must move the raised foot, horizontally left, to a position hopefully centered over the brake pedal. Lastly, the driver must push their elevated foot forward to hopefully apply brakes in time to avoid whatever caused the braking reflex in the first place.

Such a time delay is most unacceptable in the rush of an emergency type situation and especially during high speed travel where the vehicle will travel many yards in each second. There are several situations that can often affect the ability to execute timely braking First, the driver's foot can move too far in the left direction to the left for the brake, or not far enough. This will cause the driver to miss the brake entirely by pushing down on the floor rather than the brake. Even if the driver realizes his mistake and correctly replaces his foot on the brake pedal, it is still usually too late to avoid an accident.

There are situations when the driver's foot or leg may be physically unable to move or elevate high enough and/or move quick enough laterally, to be properly centered over the brake pedal. Thus, they will strike the brake shaft instead, and possibly merely press their foot on the floor to no avail.

There are also those circumstances that confuse certain drivers resulting in a late brake application or none at all. Further, without proper electronic or mechanical brake and throttle position sensing resulting in one or both of automatic braking or throttle lockout, there will always be worse scenarios which occur when the driver accidentally mistakes the throttle pedal for the brake which causes an accidental application of throttle instead of brake. Rather than slowing as intended, the vehicle will accelerate.

In any event, the ultimate result of any such occurrence can cause severe consequences. In emergency situations requiring instantaneous and effective braking, either there will be no braking, the actual braking will be too late, or worse, the driver will hit the wrong pedal causing accidental acceleration instead of the desired slowing of brakes. It seems however, that these problems can be alleviated through the employment of the mechanical or electronic means for controlled or automatic braking and throttle lockout within the vehicle pedal design and implementation as disclosed herein.

As noted, it is often very difficult to determine the actual cause of an accident, especially if there are no surviving or reliable witnesses. Those accidents caused by improper speed control (no braking, late braking or accidental acceleration) may be referred to as "resultant causes" as there are usually several obscure "initial causes" that have brought about the final resultant act. Again, if the accidental acceleration was recognized by an electronic or mechanical sensor or the like, the resultant accident could have been averted. For example, an electronic or mechanical sensor could be placed in a communication with the throttle of the vehicle, which when triggered due to an accidental acceleration, would instead result in automatic breaking and/or a throttle lockout both of which can be electronically or mechanically actuated.

It is the object of the present invention to rectify the above noted problems with the disclosed foot control design of present utility and passenger motor vehicles with pedals configured to take advantage of natural human responses while driving.

It is a further object of this invention to employ the left foot as the primary braking foot and the right foot as an optional secondary braking foot to enhance driver control of vehicles.

It is another object of the invention herein to correct the very serious problems with conventional pedal designs in vehicles which are especially dangerous even near-emergency type situations.

It is an additional object of this invention, to provide a vehicle pedal control system that takes advantage of the positive instinctual physiological human response to approaching road conditions, to speed braking and a de-acceleration of vehicles.

It is yet another object of this invention to provide means for electronic sensing of the throttle and/or brake system, which when operatively employed using electronically controlled or simple analog actuated components, will provide resulting mechanical or electronic means for automatic initiating braking and/or throttle lockout.

Finally, it is an object of this invention, to rid vehicles of driver-caused delay from acceleration to braking, by removing the need to raise and laterally translate the driver's foot to brake the vehicle.

These and other objects, features, and advantages of the invention will be brought out in the following part of the specification, wherein detailed description is for the purpose of fully disclosing the invention without placing limitations thereon.

SUMMARY OF THE INVENTION

The present invention provides systems and methods designed to prevent not only the unintentional misuse of vehicle foot controls, but the intentional abuse of controls as in unauthorized drag racing. Further, the device and method herein, takes advantage of the instinctive human response while driving to de-accelerate which is to move the control foot forward to both stop and brace the body of the driver, to achieve almost instantaneous braking of the vehicle.

A particularly preferred aspect of the preferred mode of the invention is the gradual conversion of pedal-type foot controls into panel-type foot controls, with the panel-type controls being substantially large planar members wherein the brake foot control panel covers a substantially wide portion of the driver's foot well.

Such design allows for the most direct and easiest access of either foot from any position to any desired control, especially the brake. Another preferred aspect of the present invention is the teaching wherein the shafts and linkages to foot control pedals and panels for all functions (e.g., throttle, brake, clutch, etc.) in each preferred mode described herein, are lengthened or shortened to achieve two substantially planar levels. That planar level highest from the floor would consist of the throttle and clutch control panels. The lower planar level would consist of all brake control panels and would be below the throttle and clutch control level and closer to the floor, or firewall baffle. It is preferred that both planar control surfaces would lay in an approximate sixty-degree angle to the driver's level floor.

However, those skilled in the art will appreciate a plurality of alternative preferred angles and dimensions as to conform to ergonomic standards and the like, to conform to many different vehicle designs and configurations, and which take advantage of normal human response to brake and brace, and are anticipated in this disclosure. As such, the preferred modes of the invention disclosed herein are noted to simply portray the overall intent and scope of the invention and should not be considered limiting, and any such design as would occur to those skilled in the art, which takes advantage of the human response to move the foot forward rather than sideways, is anticipated within the scope of this invention.

Such preferred designs as herein disclosed, significantly increase the ability of any driver's sliding foot to reach any desired control, and especially the brake, in the least distance and time and with the least physical and mental effort.

Additional preferred aspects to the present invention are as follows:
1) the use of forward and side control baffles to eliminate any possibility of unwanted obstacles interfering with control operation; and,
2) the generous use of side and forward foot stops to aid a driver's identification of a foot's correct position on proper controls by feel.

As will be clear in the description that follows, the objects of the invention provided by the various modes include, but are not limited to: the ability of either left or right foot to apply immediate braking pressure from any position; the minimization of either foot reaching the wrong control by mistake; minimization of obstructions accidentally interfering with control operations; minimization of the abuse of power, as in drag racing; minimization of the physical effort required to reach and operate a desired control; and, the maximization of a driver's subconscious feeling of competence as the system of control usage is logical, simple and easy to operate correctly.

A still further particularly preferred improvement is the fact that the present invention eliminates the unnatural, awkward and time consuming necessity of the conventional designs which require the throttle foot to be raised up and back, before transitioning and only then to push forward on a brake control. This as noted, is the exact opposite of any driver's instinctual physiological and psychological response to an oncoming emergency which requires de-acceleration, especially under stressful, fast changing traffic and emergency conditions.

The present invention involves the recognition of a previously unknown and unestablished natural and instinctual physiological response to approaching emergency conditions, and a re-arrangement and reshaping of conventional motor vehicle foot controls to aid such instinctual response. Experimentation has discovered a very natural and instinctual human response student pilots undergo when approaching dangerous flying conditions. Further experimentation has observed the exact same response from the drivers of motor vehicles approaching similar conditions. If this natural and instinctual physiological response had been recognized decades ago, and appropriate corrections to how we control a car, many thousands of lives could have been saved in the United States alone, and thousands upon thousands more world wide.

This instinctual maneuver from herein is to be referred to as the "Brake and Brace Response" to approaching danger, and, we all do it. When drivers and passengers get into a car to start a trip, they generally buckle-up (not always) and assume a more or less attentive and forward position, drivers especially more than passengers. But once the shifting of gears (if necessary) and maneuvering around traffic to achieve a normal cruse condition is accomplished, everyone seems to assume a more or less relaxed position, even the driver.

Most passengers will tend to spread their arms and legs with their toes pointing outward about ten to twenty degrees to the left and right respectively, providing a relaxed and comfortable seating position. The driver will do pretty much the same thing to what ever degree possible in the driver's crowded foot well. The driver's left arm will be resting on either the driver's lap, the left arm rest, or the window sill. The driver's left foot will be resting on the floor. The right foot will be either on the throttle or on the level floor if in automatic cruise control.

It is from this generally relaxed position that passengers will execute a three step process to brace as the driver performs the same three step process to "brace and brake" when approaching a dangerous condition. Most three step recoveries are made from a relaxed position once cruise has been established.

The first step in the brake and brace maneuver is for the foot and toes to turn to a more forward position. The second step is for the legs and feet to close to a more central position. Both of these first two steps may be performed at practically the same time. The third step is the primary step as it is not only the forward movement to brace, but the driver's essential movement to apply brakes. As the legs and feet close to a more central position, so do the arms to apply both hands on the steering wheel and to brace for possible impact. The first two lateral movements are the very most natural physiological response to protect the most sensitive and important functions of the human body, the sexual organs and the head. It is essentially a "close and push" maneuver. As the turning of the feet forward is the first step and takes the least time and effort, in the present invention it is this movement of the throttle foot that will be designed to initiate an immediate disengagement of throttle control and engagement of brake control under stressful situations.

In all preferred modes of the present invention, the left and/or central brake pedal/panel will always cover the largest control area per design so as to be easily available to either sliding foot from any position. There are two possible throttle/brake designs, either or a combination of which may be used in any of the modes to be shown in this disclosure. The first throttle/brake mode design will be referred to as an "Angular and Laterally Oriented Transition From Throttle to Brake System" which will be referred to as Model-A. It must be noted that the names and terms associated with the preferred modes and design of the present invention are given merely to aid in describing the preferred modes and therefor should not be considered limiting to the scope and operation of the device.

In this system, the throttle is placed in an approximate twenty degree angle position relative the vertical as there is less natural tendency for a driver to race or floorboard the throttle in an angled position. Those skilled in the art will recognize that the preferred modes discussed in this disclosure may be subject to modification and alterations without departing from the overall scope and intent of the invention and are anticipated.

The second throttle to brake mode is referred to as a "Forwardly Oriented Transition of Throttle Control to Brake Control System" and will be referred to as Model B. Each system has one and the same objective; to reverse the negative results experienced from the very natural and instinctual physiological and psychological driver responses to stressful emergency driving conditions that results from present automotive designs, to a more positive life-saving response with the designs of the present invention. In each of the two throttle-to-brake designs, and with least effort and confusion, the throttle, in actuality, becomes a brake that is available, without confusion, for immediate use by the left or right foot or both.

It should be further noted at this point that timing is of greatest importance as the time necessary to apply brakes will determine which of the three steps the driver will naturally end up eliminating. The shorter the time necessary to respond, the more steps will be naturally eliminated to achieve the most important primary step, that of pushing forward to "Brace and Brake". With Model A, the time to respond is shortened considerably by allowing the initial turning forward of the throttle foot to initiate the movement of the foot forward to brake without first requiring the leg and foot to move left to a more central position over brakes. As will be shown, the simple lateral turning of the throttle foot forward will disengage the throttle and engage the brake in one step. Such action will reduce response time to less than one second.

With Model B, response time will be reduced to less than ¼ second or to immediate response by either foot, even while the throttle foot is still on the throttle and the left foot active on the clutch in manual transmission cars. The same principle as applied to the left foot for immediate braking also allows for the possible application of brake or clutch independently or simultaneously resulting in no loss of control during certain shifting operations.

In all preferred modes of the present invention, the throttle, brake and clutch control pedals/panels may vary in forward and aft length from the conventional firewall baffle to the leading edge of the driver's level floor, depending on the particular mode. The trailing edge of those panels that are not long enough to reach a hinged connection to the leading edge of the level floor, will be held to the floor by a contracting biasing means such as a spring located at the connection of the panel to its control linkage or shaft (not shown).

Such arrangement prevents the possibility of a forward sliding foot under-cutting a control panel and striking the control linkage or haft instead. The throttle and clutch control panels will preferably be wide enough to accommodate the average foot. The brake control panels, however, will preferably cover the greatest area possible in any particular mode whether it is operating as a single independent left or right brake or as one single brake panel from left to right to assure the easiest access of either sliding foot from any position with least physical and mental effort to the brake.

There is a generous use of forward and side foot stops in all modes to aid a driver's correct identification of foot control placement by feel. As an additional aid to such identification, the surface of all control pedals/panels will be friction oriented to further aid the preferred forward/aft or lateral movement of a sliding foot.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects and advantages of the present invention which will become subsequently apparent reside in the details of the construction and operation as more fully hereinafter described and claimed, reference being had to the accompanying drawings forming a part thereof, wherein like numerals refer to like parts throughout.

BRIEF DESCRIPTION OF DRAWING FIGURES

FIG. 1b shows a side view of FIG. 1a.

FIG. 1c shows another side view of the FIG. 1a.

FIG. 2b shows a top view of the device of FIG. 2a.

FIG. 2c shows a side view of the mode of the device of FIG. 2a.

FIG. 2d shows another side view of the mode of the device of FIG. 2a.

FIG. 3a shows a front view of another preferred mode of the device.

FIG. 3b shows a top view of the mode of the device of FIG. 3a.

FIG. 3c shows a side view of the device of FIG. 3a.

FIG. 3d shows another side view of the mode of the device of FIG. 3a.

FIG. 4b shows a top view of the mode of FIG. 4a.

FIG. 4c shows the side view FIG. 4a.

FIG. 5b shows a top view of the device of FIG. 5a.

FIG. 5c shows a side view of the device of FIG. 5a.

FIG. 6b shows a top view of FIG. 6a.

FIG. 6c shows a side view of FIG. 6a.

FIG. 7c shows a side view of the device of FIG. 7a.

FIG. 8b depicts a side view of the device of FIG. 8a.

FIG. 9a shows both the throttle and clutch control panels in a braking position noting that the brake can be designed to operate as one single brake system, or as two separate independent throttle and clutch braking systems.

FIG. 9b depicts both throttle and clutch in their normal idle positions.

FIG. 10a shows the throttle control panel to brake engagement system wherein the TCP is held to the railings by four sliding railing clamps.

FIG. 10b shows the end view of the control panel and its clamps.

DETAILED DESCRIPTION OF THE PREFERRED EMBODIMENTS OF THE INVENTION

Figure 1A:
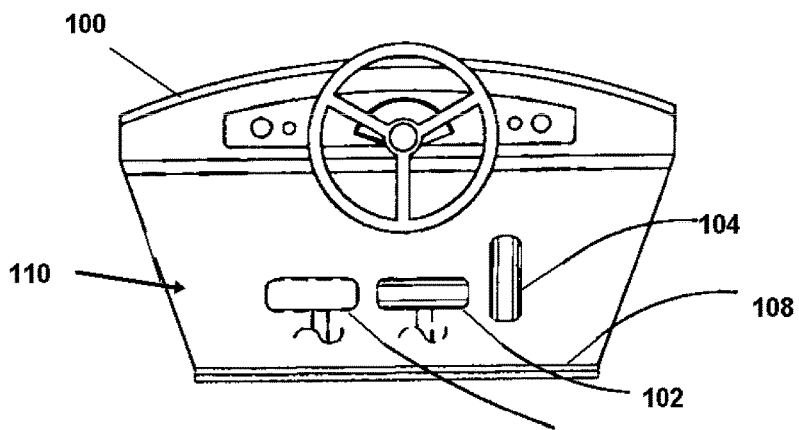
FIG. 1a depicts an elevated view of a prior art driving console, pedals, foot well, and floor of passenger and utility motor vehicles noting that the throttle and brake pedals are only separated by one or two inches at the most.
Figure 1B:
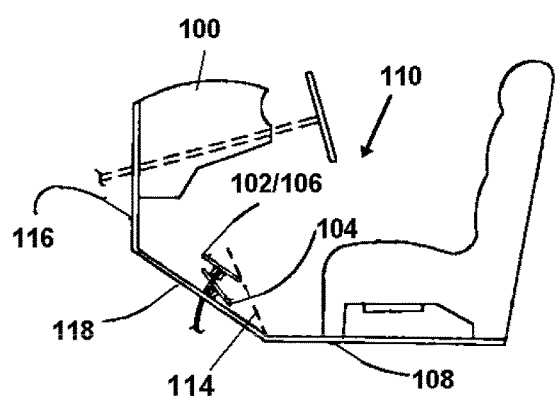
Figure 1C:
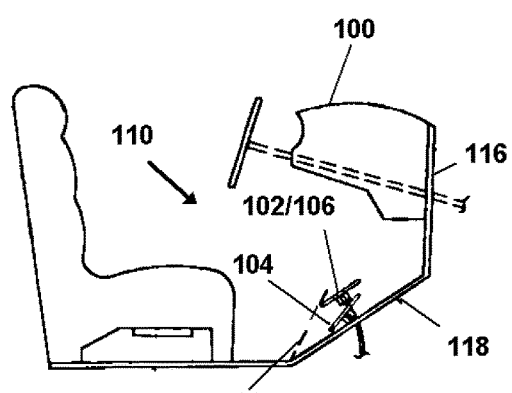

Now referring to drawings in FIGS. 1-12, wherein similar components are identified by like reference numerals, there is seen in FIGS. 1a, 1b, and 1c, the conventional prior art driving console 100, foot well 110, brake pedal 102, throttle pedal 104, clutch pedal 106, and floor 108 of passenger and utility motor vehicles. Note that in FIG. 1a the conventional throttle 104 and brake 102 pedals of many current vehicles are only separated by one or two inches at the most.

Also, note that in FIGS. 1b and 1c, on conventionally employed controls for vehicles, the throttle pedal 104 is always lower than both clutch 106 and brake 102 pedals, making it the easiest pedal to reach with the least effort. Take special note of the dotted line 114 representing a foot with its heel on the level floor, and the ball of the foot resting on a brake pedal at an approximate sixty degree angle. It is this angle that will be duplicated for all controls in the present invention. Also shown more clearly in side views, the foot well 110 generally includes a firewall 116 and foot control platform 118.

Figure 2A:
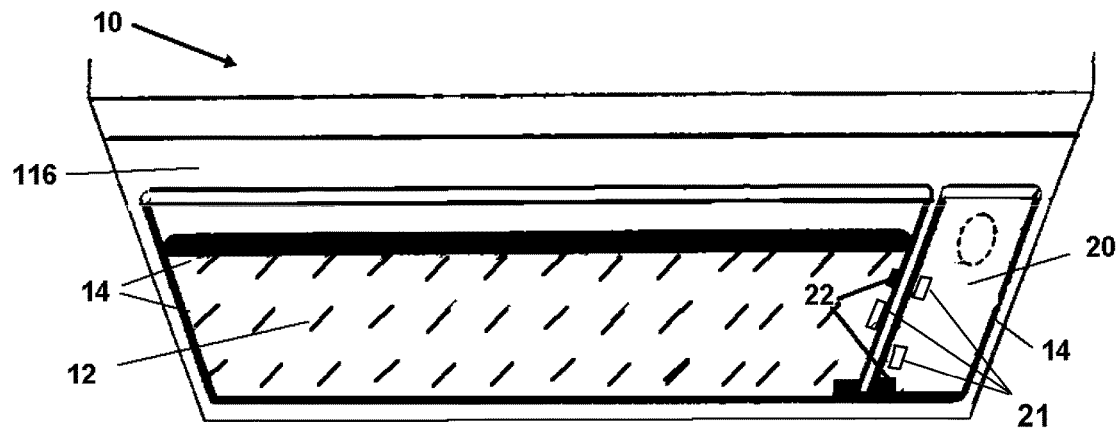
FIG. 2a shows the front view of a particularly preferred automatic transmission motor vehicle's foot well of the present invention.
Figure 2B:
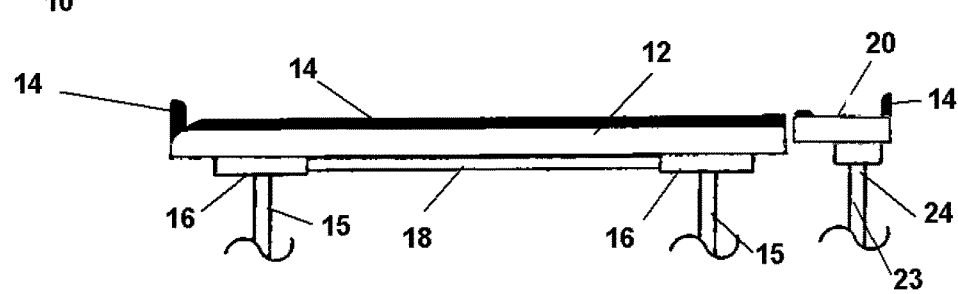

FIG. 2a shows the front view of an automatic transmission motor vehicle's foot well employing a particularly preferred mode of the disclosed device 10 of the present invention. A brake control panel 12, herein also referred to as the BCP, has replaced the prior art small brake pedal 102.

In one preferred mode, shown for instance in FIG. 2a, it is preferred that the BCP 12 be a fan-shaped substantially large-area planar member providing for improved accessibility to either driver's foot from any position such as in FIG. 2a where the BCP 12 fans from a narrow lower edge to a wider upper edge.

As shown in FIGS. 2 and 2a, the BCP 12 may include foot stops 14, such as raised protrusions at the wider end, and along side edges, to maintain a user foot within the area of the BCP 12 when in use and prevent the foot from accidentally sliding off. In FIG. 2b, the BCP 12 is solidly attached to two hydraulic brake shafts 15 and attachment plates 16 which are firmly joined by a connector rib 18 although one shaft 15 might be employed in other modes.

Further, the throttle control panel 20 or pedal, herein also referred to as the TCP, is preferably angled around its perimeter at approximately twenty degrees forming a parallel angled rectangular. The right and left sides of the BCP 12 are also aligned at an approximate twenty degree angle which is complimentary to the angle of the adjacent side of the BCP 12. However, those skilled in the art will appreciate various other angles employable without departing from the scope and intent of the invention and are anticipated.

The right side of the BCP 12 and left side of the TCP 20 both communicate operatively or are engaged with power cut-to-idle inducing electronic sensors 21 or switches 22. The slightest touch or a contact with either of these switches 22 or if employed electronic sensors 21 by either the right or left foot of a driver, will automatically and immediately deactivate the throttle linkage 23 engaged with the attachment plate 24 and cause the engine to go to an idle. The linkage 23 may be moved to the idle position where it will remain unusable until the TCP 20 itself has returned to the idle position. The switches 22 and/or electronic sensors 22 thus on contact providing a means for switching an automatic throttle lockout and maintaining the engine at an idle, wherein the vehicle will no longer accelerate. The BCP 12 preferably covers the entire foot well from the firewall baffle 116 to the leading edge of the driver's level floor 108 and from left to right, excluding the immediately ajacent area occupied by the closely proximate TCP 20.

As noted, in one preferred mode of the invention herein, the means for automatic throttle lockout can be provided solely by electronic sensors 21 operating as position sensing components which may be employed in place of, or in combination with the safety switches 22. The electronic sensors 21, such as electronic motion, pressure, contact or optical type electronic sensors 21, are preferably in a wired or wireless communication with a computing component (not shown but well known) running software adapted at the task of electronically shutting off the throttle control and rendering the engine to idle, also referred to as throttle lockout herein. This mode of the invention is especially preferred for vehicles which already or will employ onboard engine computing and electronic throttle controls also known as fly-by-wire, as opposed to those having mechanical control such as using cables and mechanical actuators. Additional descriptions of some preferred electronic components employable as the electronic sensors 21 are provided later in this disclosure.

Figure 2C:
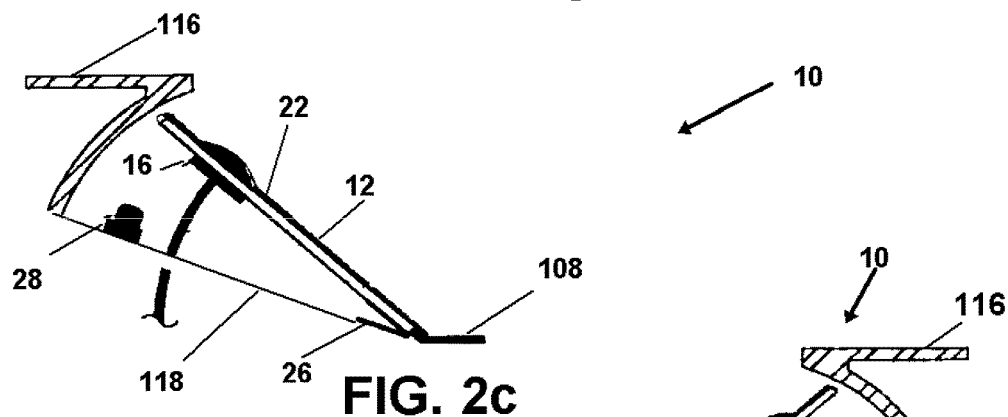
Figure 2D:
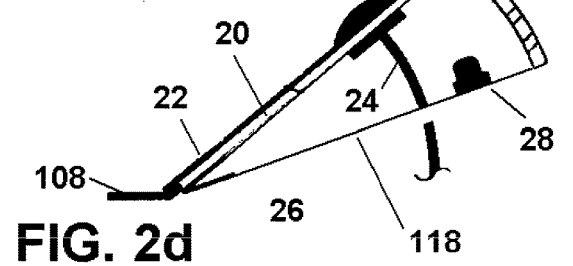

It is particularly preferred that the plane of the BCP 12 contacted by the foot of the driver, such as in FIG. 2a, is preferably up to ¼ inch lower (closer to the vehicle floor) than the plane of the TCP 20, however if desired it may be spaced more or less as needed. Such a spaced configuration allows the driver to easily identify the pedals by tactile feel of the foot, whether his or her laterally sliding foot is on the throttle or brake. FIG. 2c and FIG. 2d show side views of the current mode of the device 10 depicting the hinges 26 engage the BCP 12 and TCP 20 to the floor 108.

In some preferred modes, the hinges 26 may be operatively engaged to positional sensors, such as a potentiometer, and electronic proximity sensor which sends a varying electronic signal based on positioning of the potentiometer around an axis or proximity, or the like, to provide and determine the BCP 12 and TCP 20 location. This mode of electronic sensors 21 are preferably in communication with an onboard computing device or server or the like running software adapted at the task of relating BCP 12 and TCP 20 location, vehicle speed, potential hazards, and so forth, as in the mechanical mode herein, and then initiating automatic braking and/or throttle lockout to render the engine to idle, using electronically actuated components such as switches, solenoids, and linear motors and the like or other computer actuated components as would occur to those skilled in the art.

In FIG. 3a, FIG. 3b, FIG. 3c, and FIG. 3d there is shown a left BCP 13 and a clutch control panel 30, herein also referred to as the CCP, of a manual transmission vehicle, either of which may be operated separately by the left foot or together to avoid unwanted vehicle movement during certain gear shifting operations. The CCP 30 is engaged to the clutch control shaft 19 via the attachment plate 17.

The size of either left or right-positioned brake panels 12, 13 should be as large as possible for easier driver accessibility. Note the approximate two-inch space between the left BCP 13 and the CCP's forward foot stops 14. Note also the foot stops 14 on the left side of the throttle 20 and brake 12 and the left BCP 13. Again, this mode adds significantly to any driver's ability to accurately determine a foots correct placement by feel and without actually viewing them.

In the side views of FIGS. 3C and D, can be seen the presence of the CCP 30 that is hidden from view by the left BCP 13 in FIG. 3c and the TCP 20 in FIG. 3d, and the obstacle baffle 117 extending within substantially 3/16 inch of the control panels to prevent any possibility of obstacles falling between the BCP 12 and the foot control platform (FCP) 118 and interfering with its operation.

Also the addition of a floor safety button 28 below the TCP 20 can be seen. As with the brake and throttle safety switches 22, the slightest communication of the floor safety button 28, by a descending TCP 20, will automatically and immediately cause the throttle linkage 23 connected to the engine to throttle power, to be communicated to the idle position where it will remain unusable until the TCP 20 has itself returned to the normal idle position, thus providing means for throttle lockout. Any attempt by the driver to depress the throttle 20, either from panic or an attempt to drag race, will send a single electronic impulse to a computing device to deactivate the throttle and render the engine to idle. Again, it is noted that in other preferred modes of the invention, an electronic sensing means or electronic sensor 21, which will communicate a signal to a computing device having memory and running software adapted at the task of initiating the actions herein noted, based on the electronic signals received from electronic sensors 21, may be employed instead of the mechanical or electromechanical modes herein. Such may be employed to automatically and immediately cause the throttle linkage 23, be it electronically actuated or mechanically actuated, to reduce engine speed to idle.

For example, employing instead of, or in combination with, the safety button 28, an electronic proximity sensor 29 or other such position sensing device suitable for the intended purpose which will communicate an electronic signal to a computing device which is employable by software adapted at the task, may be employed to thereby determine TCP 20 a location, and electronically initiate mechanical or electronic means for throttle lockout to idle as needed. Such might be a switch, solenoid, linear motor, or other electronically activated component. Alternatively, and especially preferred for vehicles employing OEM electronic throttle control, the electronic sensor 21 or button 28, may instead simply electronically disable the throttle to idle, through an electronic communication to the OEM vehicle throttle control.

Figure 4A:
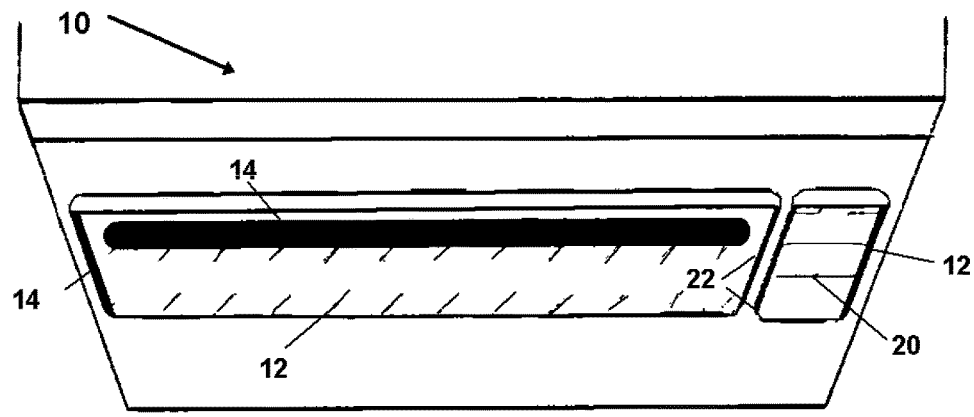
FIG. 4a show the front view of an additionally preferred automatic transmission motor vehicles foot well that is shown in the pedal configuration prior to any rearward extension towards panel length.
Figure 4B:
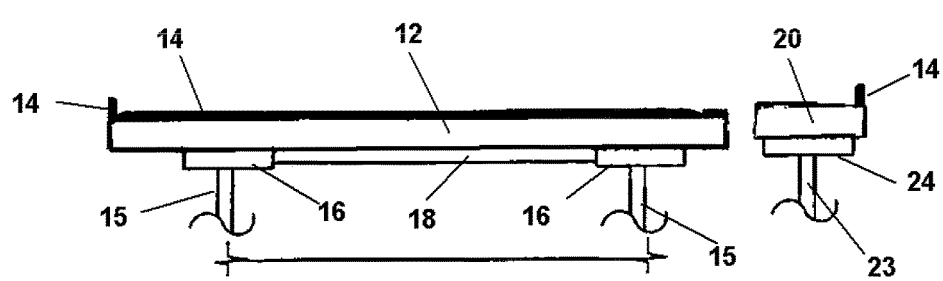
Figure 4C:
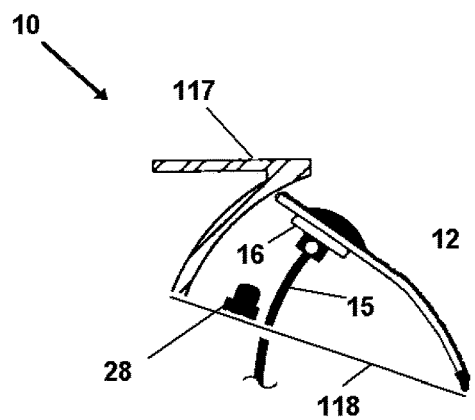

FIG. 4a and FIG. 4b show the top and front views of still another mode of the device 10 depicting an automatic transmission motor vehicles foot well that is still in the pedal configuration prior to any rearward extension towards panel length. FIG. 4c shows the end view of A and B. Note, as mentioned earlier, that the trailing edge of the pedals 12, 20 are held to the floor 108 by a spring loaded at the connection of the pedal to the brake shaft, (not shown). Such arrangement prevents any forwardly sliding foot from undercutting the pedal and hitting the shaft instead.

Figure 5A:
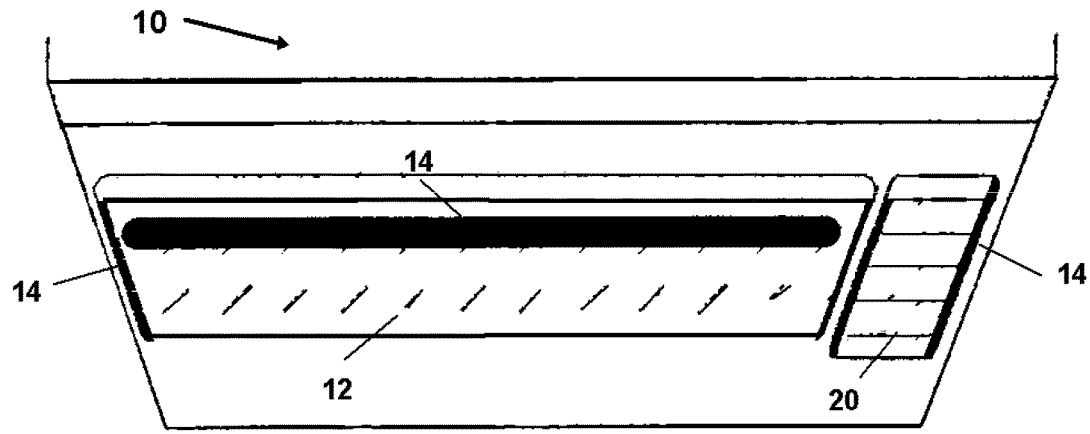
FIG. 5a shows a front view the first rearward extension of control panels for an automatic transmission vehicle.
Figure 5B:
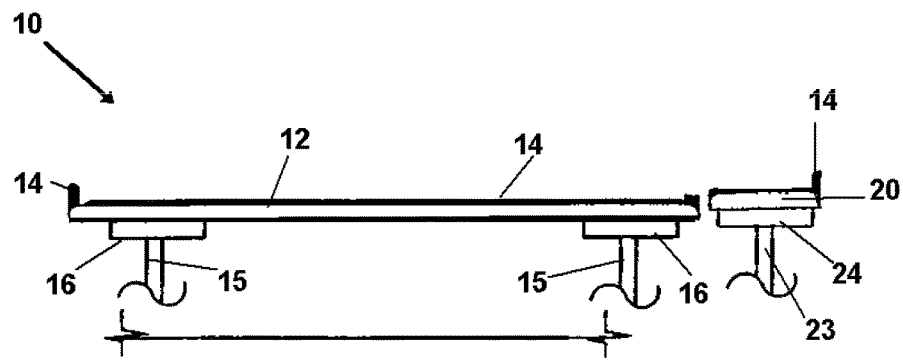
Figure 5C:
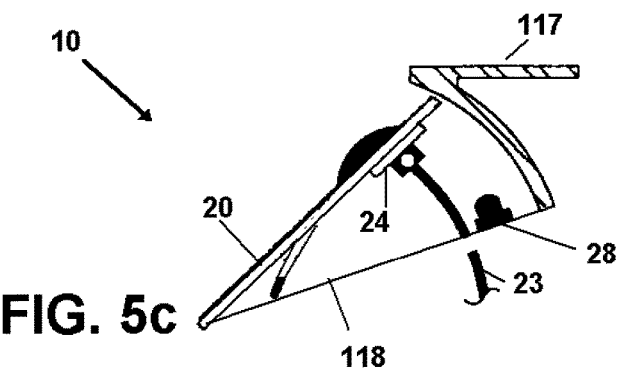

In FIG. 5a, FIG. 5b, FIG. 5c, there is shown the first rearward extension of control panels for an automatic transmission vehicle. This position may be referred to as the "pedal/panel" position. Any further rearward extension of controls would be referred to as a normal panel position hinged at the leading edge of the driver's level floor. All such extensions apply equally to automatic or manual vehicles.

Figure 6A:
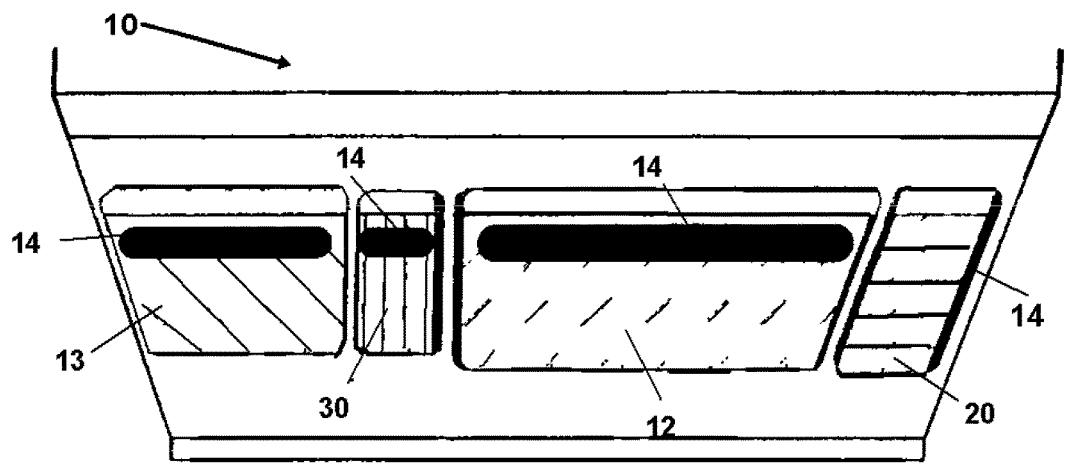
FIG. 6a shows a view of the extension of a manual transmission vehicle's controls to the pedal/panel position.
Figure 6B:
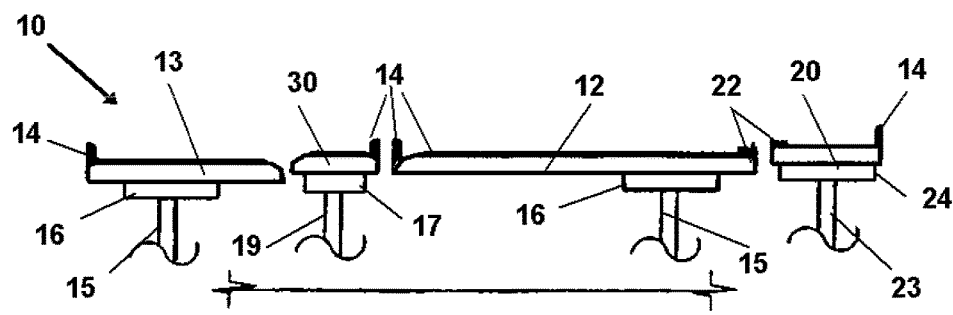
Figure 6C:
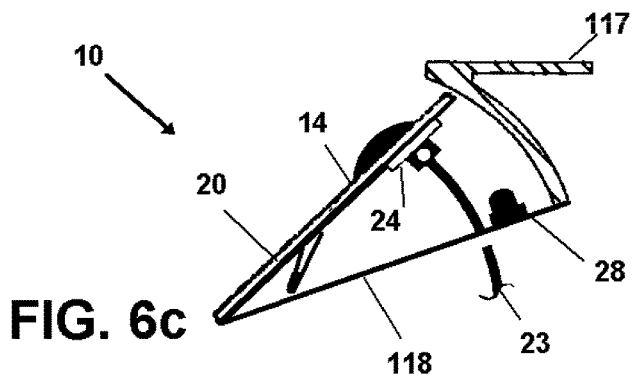

In FIG. 6a, FIG. 6b, FIG. 6c show the extension of a manual transmission vehicle's controls to the pedal/panel position. This model is basically the same as FIG. 5, except for the addition of the CCP 30 and left BCP 13. It should be noted at this point that the same configurations of pedal or panels as shown in FIGS. 4 and 5 will be basically the same for any manual transmission car.

Figure 7A:
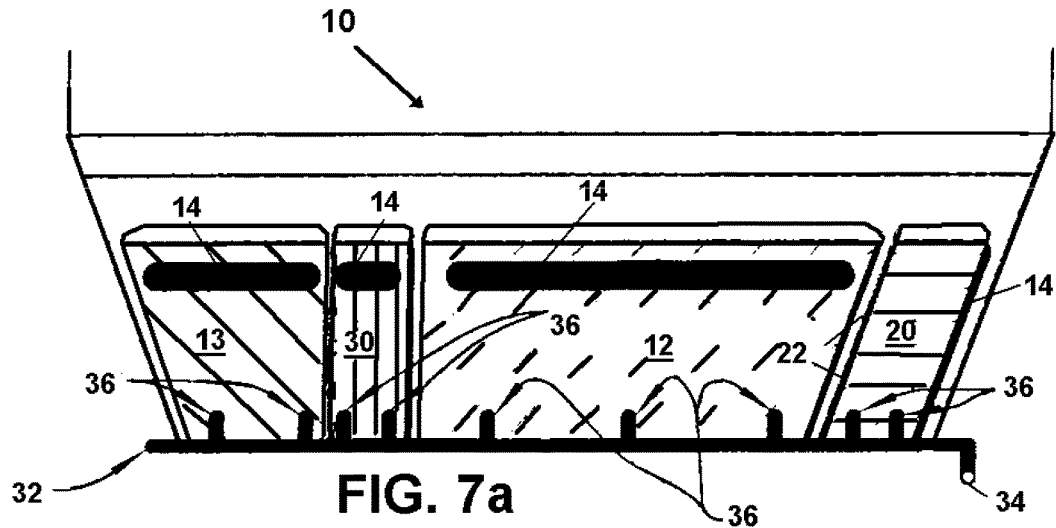
FIG. 7a shows a front view of the conversion of control shafts and linkages from the forward position of control panels to the rearward position at the leading edge of the driver's level floor.
Figure 7B:
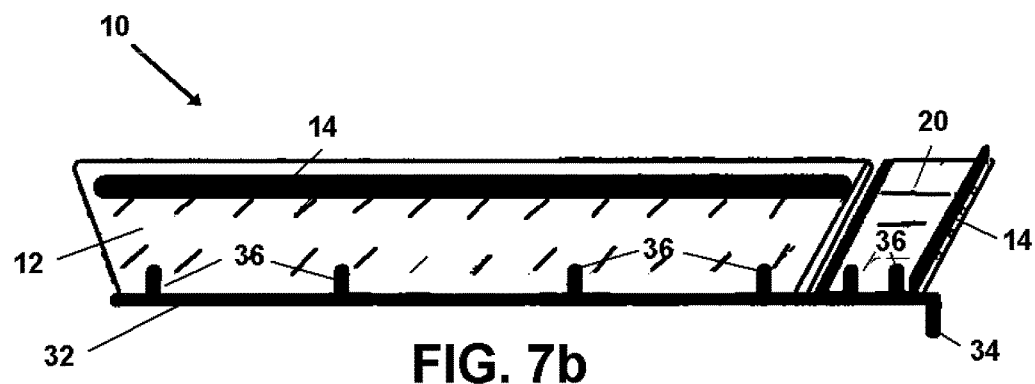
FIG. 7b shows a front view of the mode of the device of FIG. 7a except for a automatic transmission vehicle.
Figure 7C:
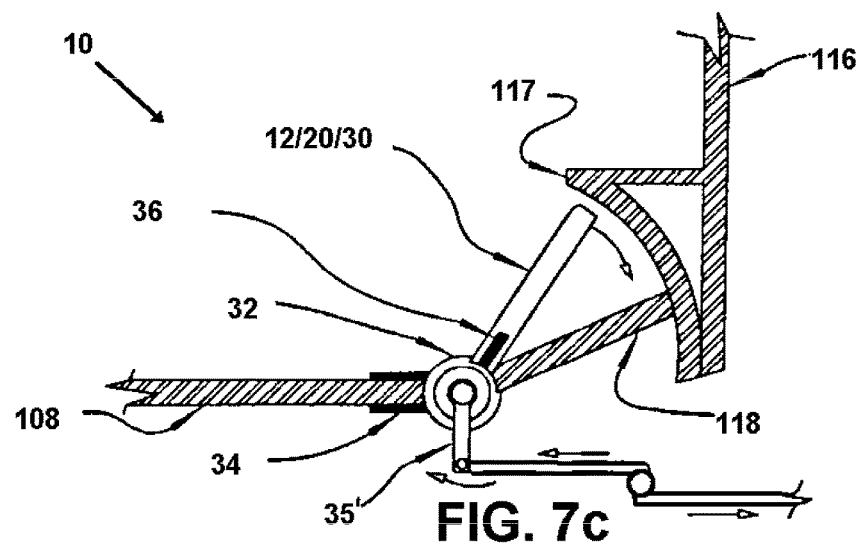

In FIG. 7a, FIG. 7b, FIG. 7c shows the conversion of control shafts and linkages from the forward position of control panels to the rearward position at the leading edge of the driver's level floor. FIG. 7c will apply equally to FIG. 7a, a manual transmission vehicle, as to 7b, an automatic transmission vehicle. Any and all brake control panels are fixedly attached to a brake control rod 32 running the full width of the foot well. Such brake control rod 32 is further fixedly secured to the leading edge of the driver's level floor by brake rod floor clamps 34 and is rotationally engaged to rotate freely forward and aft in that position within certain design limits.

In FIG. 7A, both clutch 30 and throttle 20 control panels are attached to the brake control rod 32 by rod clamps 36 that rotate freely about the brake rod 32 within their individual design limits. A brake rod arm 35 extends from whatever position on the brake rod 32, left or right end or center, to connect to further brake linkage to effect braking. Similar extension arms will extend from both clutch 30 and throttle 20 control rod clamps 36 to connect with their respective functions (not shown).

Figure 8A:
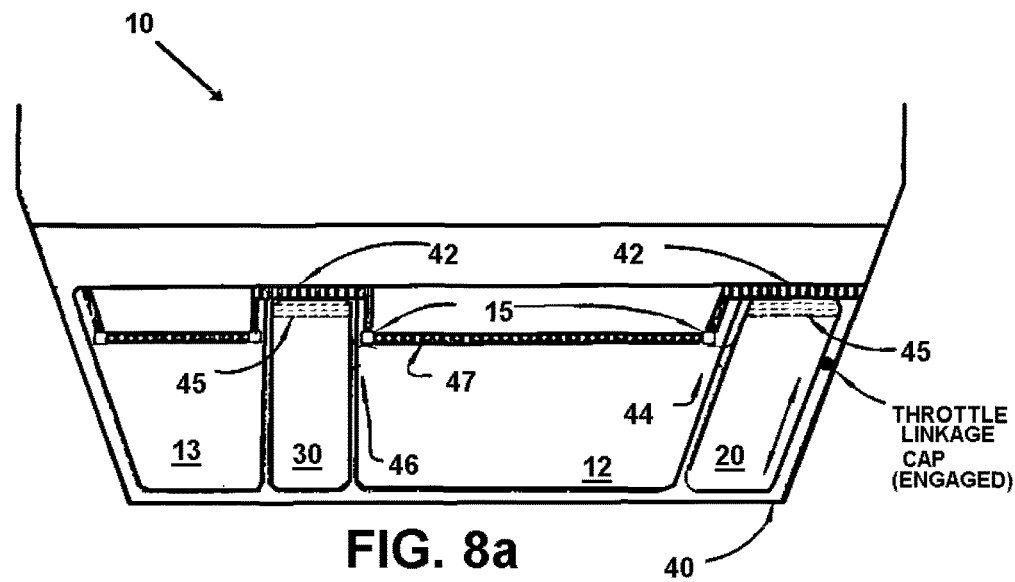
FIG. 8a shows a front view of the preferred Model-B mode of the device with the same basic outline as in FIG. 3a of Model-A.
Figure 8B:
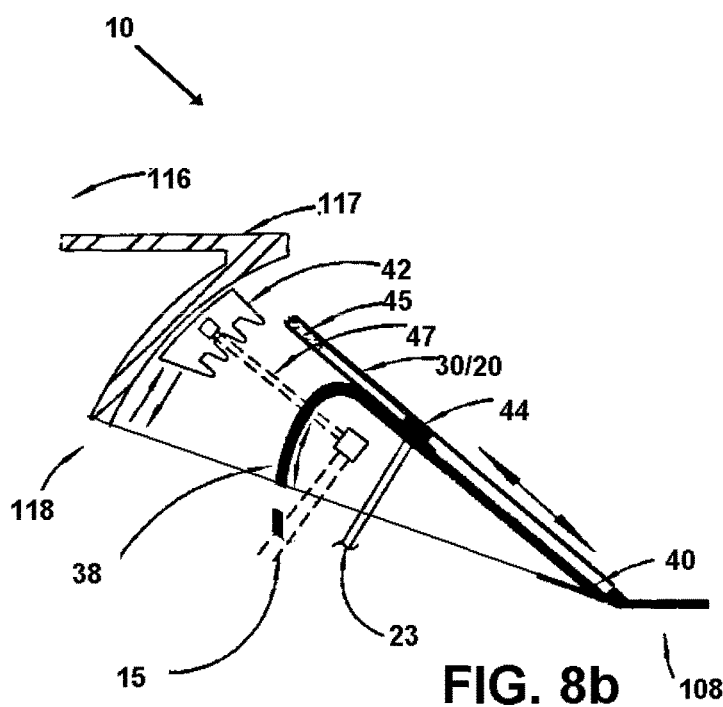

In FIG. 8a, FIG. 8b, showing a preferred Model B mode of the device 10 we see the same basic outline as in FIG. 3A of Model A. The only difference between Model A and B is that the throttle or TCP 20 can be disengaged and brake or BCP 12 engaged in the most natural, normal and instinctual forward motion of the throttle foot. When drivers instinctively move their throttle foot toward the front of the vehicle, to brace for slowing down or stopping, they are automatically performing the exact same natural maneuver that is required to apply braking Thus, a forward motion of the foot to brace is automatically converted to a downward motion to apply brakes.

The TCP 20 is freely is rotatable to actuate the throttle linkage 23 and slidable on this base from a first position forward on two railings 38 forming the base with one on each side of the TCP 20 (only the left railing of the base is shown in FIG. 8B). The TCP 20 is slidable between a first position closest to the driver, and a second position closer to the front of the vehicle when forward pressure is applied by the throttle foot. Once the control panel or TCP 20 has slid to a forward position, any distance at all, such as more than ½ inch, from the first position, the throttle disengagement switch 40 will automatically return the engine to idle power output, and can also return the throttle linkage 23 to the idle position where it will remain unusable until the TCP 20 itself has slid back on the base to the first position.

Once the TCP 20 has slid to the forward position on the base formed by the railings 38, out of the first or idle position furthest from the front of the vehicle any distance such as ½ inch, the leading edge 42 of the control panel or TCP 20 will engage the brake access cage 45 which is a lateral extension 47 of the vertical brake shaft 15. It is noted that the component designated as the switch 40, may instead be an electronic sensor 21 which will communicate an electronic signal to a computing device running software which is configured to, based on the signal received, initiate actions herein of the totally mechanical system, based on the electronic signal received from one or a plurality of such sensors. Preferred electronic signal generating and communicating sensors and other suitable sensing means are described elsewhere in this disclosure, however any such electronic sensor and computing component as would occur to those skilled in the art are anticipated within the scope of this application.

Also preferred, at the same time, a throttle/brake cap 44 located on the left side of the control panel TCP 20 about ½ inch reward from the vertical brake shaft 15, will also move forward over the brake shaft 15 to also force the brake shaft 15 downward. The three step process to accomplish conventional braking as identified previously, clearly shows the time consuming process necessary to apply immediate braking Model A of the device 10 herein, eliminates the time consuming, awkward and unnatural necessity of raising the foot up and back to above brake pedal height. Model B of the device 10 herein, further eliminates the time consuming necessity of moving the leg and foot in a direction toward left, to a braking position.

Such design of the device 10 herein, leaves only one of the three steps left to perform. That is, the instinctual pushing forward of the foot on the accelerator, to both brace and brake. The CCP 30 is under the same basic control design as the TCP 20 having a clutch/brake cap 46.

With forward foot pressure it will freely slid forward on two railings 38 until the leading edge 45 of the CCP 30 engages the brake cage 42. Further forward foot pressure will be converted downward to activate brakes while at the same time activating the clutch, the normal function desired during such braking functions.

In FIG. 9a we see both the throttle 20 and clutch 30 control panels in a braking position. Take special note that the brake can be designed to operate as one single brake system, or as two separate independent throttle and clutch braking systems. FIG. 9b shows both throttle 20 and clutch 30 in their normal idle positions.

FIG. 10a is an oblique drawing of the throttle control panel 20 to brake 12 engagement system. The TCP 20 is held to the railings 38 by four sliding railing clamps 37. The aft end of the railing 38 is hinged 27 to the forward portion of the drivers level floor 108. FIG. 10B shows the end view of the control panel and 20 its clamps 37. The brake access cage 42 may have several steps available for the engagement of a TCP 20 which may already be in a position of throttle usage. When the foot goes forward to apply brakes, fluid from hydraulic cylinder A swiftly flows to cylinder B.

When downward brake pressure is released, the railing 38 is spring loaded to immediately return to the normal level position. However, it will not return immediately to its normal rearward position to re-engage throttle 20 as its rate of return is slowed considerably by a panel return stop 50 connected to cylinder B whose fluid is slowly returning to cylinder A. Though not shown, the control panel 20, however, will not return to its normal rearward position for throttle operation until it first returns to the level position. As noted herein, the mechanical actions provided by the cylinders A and B, can instead be actuated by a solenoid or linear electric motor or another electrotechnical device, under the aforementioned control of software running on a computing device in communication with noted sensors. The electronic components can thus provide the same actions as cylinders A and B. Suitable electrotechnical devices such as those found in the Grainger or other catalogs, which will accomplish this task, can be readily discerned by one skilled in the art, and are anticipated to be within the scope of this application.

Figure 11A:
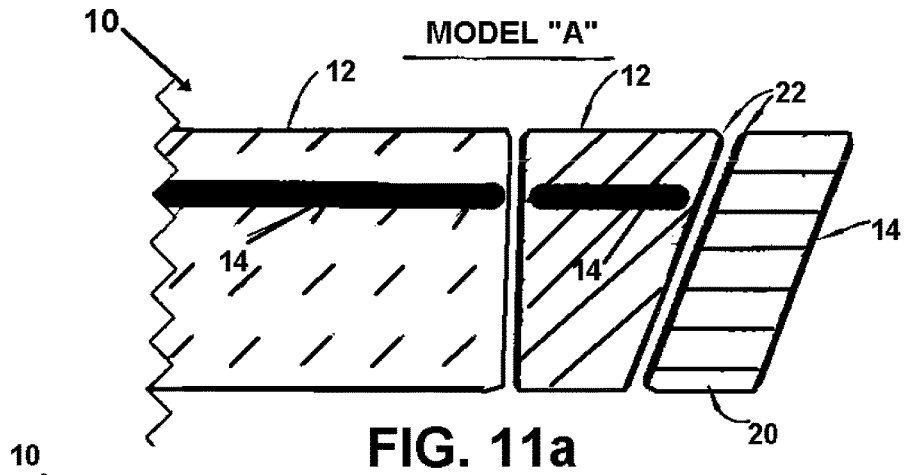
FIG. 11a shows the Model-A preferred mode of the device that has eliminated the time consuming necessity of moving the leg and foot inward to the brake to achieve braking and has already been accepted for patent.
Figure 11B:
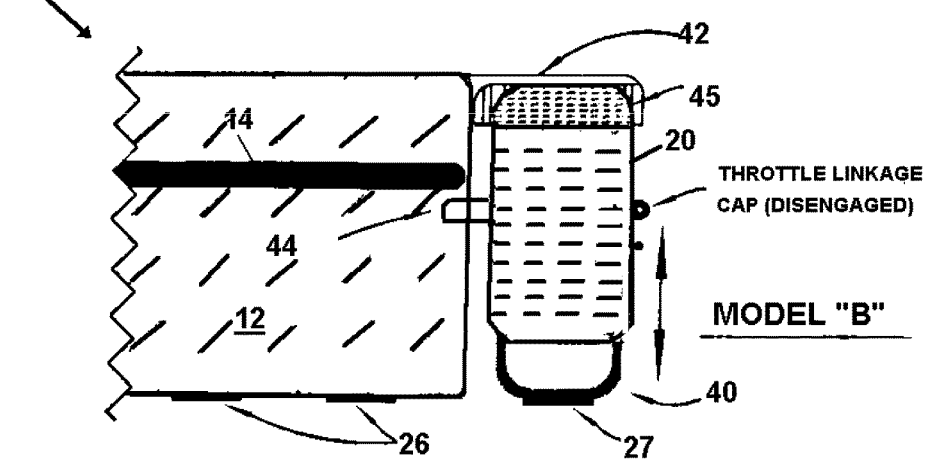
FIG. 11b shows the Model-B preferred mode fo the device that eliminates the time consuming, awkward and unnatural necessity of moving the leg and foot up and back before achieving a position to brake, further depicting the throttle in a brake captured position.
Figure 11C:
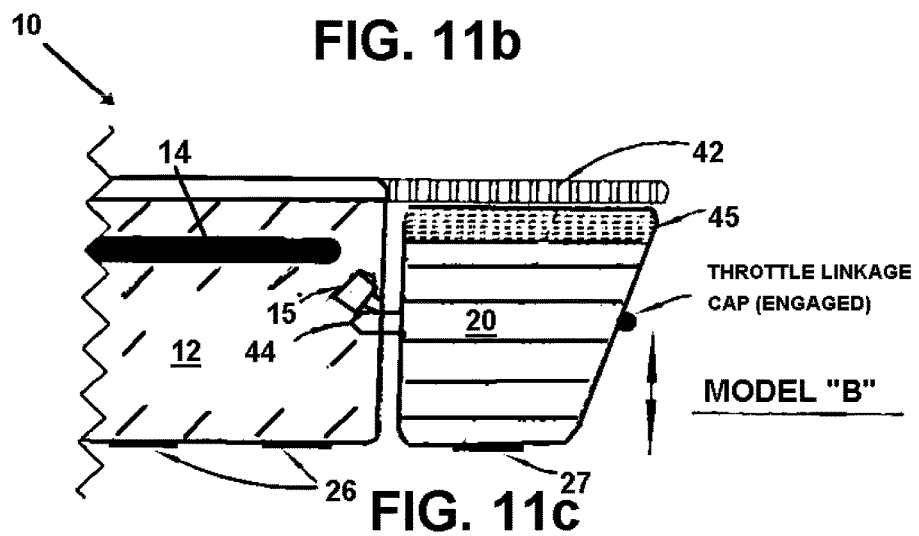
FIG. 11c shows again a Model B mode of the device with an angular throttle providing more relaxed position for the foot which is less inviting to drag racing, in the throttle position.

FIG. 11a, FIG. 11b, and FIG. 11c shows both Model-A and Model-B preferred modes of the device 10. FIG. 11A shows a Model A mode, that has eliminated the time consuming necessity of moving the leg and foot inward to the brake 12 to achieve braking.

FIGS. 11b and 11c show Model B of the same basic design that eliminates the time consuming, awkward and unnatural necessity of moving the leg and foot up and back before achieving a position to brake. FIG. 11B shows the throttle 20 in a brake captured position. FIG. 11c shows the angular throttle, a more relaxed position for the foot which is less inviting to drag racing, in the throttle position.

Figure 12:
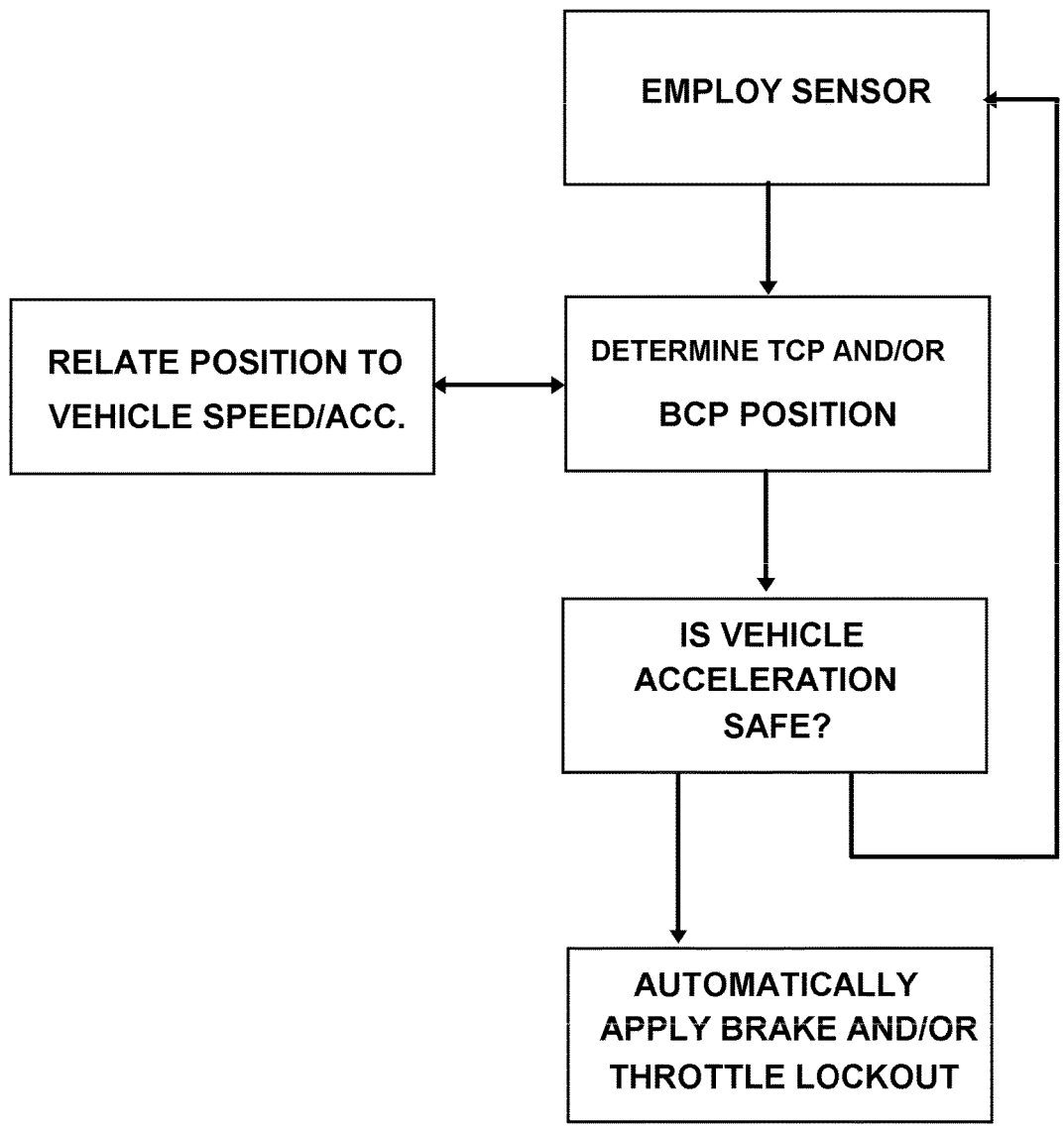
FIG. 12 depicts a simple flow chart of the system operation using electronic sensors communicating with a computing device employing software to determine vehicle acceleration and foot positions and initiate the throttle lockout and/or brake actuation noted herein.

Although no detailed schematic for a computer controlled function is shown, such function in operation is simple and self evident and as graphically depicted in FIG. 12, will accomplish the following by employing one or a plurality of operatively positioned electronic sensors such as location or proximity sensors communicating an electronic signal to a computing device running software adapted to the task of locking out the throttle such as rendering the throttle linkage 23 inactive during positioning of the TCP 20 to a non-idle location. Thus an electronically actuated means throttle lockout resulting in immediate reduction of throttle linkage 23 to an idle, wherein the throttle will remain unusable until the TCP 20 itself has returned to its normal idle position. Concurrently with the throttle lockout, as noted herein and depicted, the brake may be caused to apply. Such may be provided using electronic or mechanical means, anytime it is sensed where:

1) a drivers foot communicates with a BCP 12 or TCP 20 safety switch;

2) a TCP 20 making contact with the FCP 118 safety button;

3) an excessively rapid increase of acceleration beyond a limit set by the National Traffic Safety Administration (NHTSA).

4) an excessive and simultaneous use of power and brake beyond limits set be the NHTSA.

As a preferred simple example of a mode thereof, shown in the flow chart of FIG. 12, electronic sensors employed with the device 10 will communicate with one or both of the TCP 20 and BCP 12, and are additionally in electronic communication with a computer employing control software adapted at the task of determining throttle or brake position while concurrently relating the sensed position to vehicle speed, and determining if the vehicle is incorrectly or unsafely accelerating. Using the electronic sensory input noted herein, the software upon determining a level of safety outside a determined threshold as noted above in examples, can electronically initiate automatic braking and/or a throttle lockout by sending signals to electronically controlled actuators or motors or switches to move the accelerator to idle and/or apply the brakes.

Briefly, such electronic sensors as may be employed herein can be categorized according to the categories of energy they detect and convert to an electronic signal. These categories an include one or a combination of acoustic, chemical, electromagnetic, ionizing radiation, mechanical, optical, and thermal. The International Electrotechnical Commission defines the technical details of some standard electronic proximity sensors, but in no way identifies all possible modes of such which may be employed herein.

Further, by a proximity sensor is meant device that detects objects and their proximity to a determined point, without physically contacting them. A proximity sensor adjusted to a very short range is often used as a touch switch. The detection is achieved using an electromagnetic field or beam emitted from the sensor which detects changes in that field when touched or where an object is positioned close. Proximity sensors come in a variety of types. Types of proximity sensors include inductive, capacitive, ultrasonic and photoelectric all of which can communicate an electronic signal to a computing device relating to contact or proximity thereto.

A proximity sensor often emits an electromagnetic field or a beam of electromagnetic radiation (infrared for instance) and looks for changes in the field or return signal. The object being sensed is often referred to as the proximity sensor's target. Different proximity sensor targets demand different sensors. For example, a capacitive photoelectric sensor might be suitable for a plastic target; an inductive proximity sensor may require a metallic target.

The maximum distance that this type of electronic sensor can detect is defined as nominal range. Some electronic signal generating sensors have adjustments of the nominal range or means to report a graduated detection distance. Proximity sensors which communicate an electronic signal, can have a high reliability and long functional life because of the absence of mechanical parts and lack of physical contact between sensor and the sensed object.

Other preferred electronic sensing component means which may be employed in preferred modes of the device herein can include one or a combination from a group of electronic sensors including:

Inductive sensors which have an oscillator at the input side, which detects electrically conductive substances like metal based on resistance to the signal the oscillator emits;

capacitive sensors which employ an detecting electrode and ground electrode to detect a change in the frequency emitted by an oscillator, this frequency change is then compared to a predetermined threshold, which indicates a nearby object when exceeded; Ultrasonic sensors use employ transducer to produce ultrasonic signals which are rebounded by objects in the detection area and where these rebounded signals are picked back up by the sensor to indicate an object in the area, much like a sonar system;

photoelectric sensors which project light in the detection area and receive light reflected or transmitted from the object; laser sensors consist of any of several devices that emit highly amplified and coherent radiation of one or more discrete frequencies where laser beams can simply be utilized to detect when the beam is present or broken, or can be focused and the time taken for the beam to be reflected back is measured to determine the distance;

infrared sensors can reveal an image that can be made to identify, measure or track objects, or show areas of relative cool and warmth where a virtual thermograph can be thereby created without any physical contact with the object being analyzed;

magnetic sensors see or track objects in various configurations through the use of small magnets, magnetic field strength and change through the capture and detection of objects, for example by moving or rotating the sensor and using magnetic sensor output voltage changes or changes in magnetic flux density;

pressure sensors measure pressure, typically of gases or liquids where pressure is an expression of the force required to stop a fluid from expanding, and is usually stated in terms of force per unit area where in electronic form, a pressure sensor usually acts as a transducer and generates an electric signal as a function of the pressure imposed;

acoustic sensors which are based on electret effect, inductive coupling, capacitive coupling, triboelectric effect, piezoelectric effect, and fiber optic transmission;

passive Infrared Sensors (PIR) which use pyroelectrical materials and emit electrical impulses when heated or cooled where IR radiation passes through the front of the device and comes into contact with a set of sensors made of pyroelectrical plate, crystal or film which generate electrical impulses from the sensors; and a Laser Rangefinder which bounces the energy of a laser beam off a target, and then measures the return time back to the sensor.

The principal methods by which motion can be electronically identified are optical detection and acoustical detection. Infrared light or laser technology may be used for optical detection while motion detection devices, such as passive infrared sensor (PIR) motion detectors incorporate a sensor that detects a disturbance in the infrared spectrum, such as an object, person's foot or a small animal.

Once detected, an electronic signal communicated to the computing device can be employed by software thereon configured to operate the system described above, to trigger an alarm, activate a brake lockout, turn on a camera or other enabling technology that can, for instance, capture an image or video of the motioner, or said motion or image capture can be the initial detection element.

A simple algorithm for motion detection by a fixed camera compares the current image with a reference image and simply counts the number of different pixels. Since images will naturally differ due to factors such as varying lighting, camera flicker and charged-coupled device (CCD) dark currents, pre-processing is useful to reduce the number of false positive alarms. More complex algorithms are necessary to detect motion when the camera itself is moving, or when the motion of a specific object must be detected in a field containing other movement that can be ignored.

Motion can be detected by sound (acoustic sensors) opacity (optical and infrared sensors and video image processors) geomagnetism (magnetic sensors, magnetometers) reflection of transmitted energy (infrared laser radar, ultrasonic sensors, and microwave radar sensors) electromagnetic induction (inductive-loop detectors) and vibration (triboelectric, seismic, and inertia-switch sensors).

In addition, to avoid the possibility of a fire caused by an electrical spark igniting spilling fuel caused by an impact, all fuel and electrical can be shut off at its source with anti-fire solution released in the fuel tank anytime pressure is experienced beyond a certain point set by the NHTSA or when an air bag is deployed.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An engine speed and braking control system for a motor vehicle, comprising:
    a throttle pedal slidably engaged upon a rail, said rail positioned upon a support surface of said motor vehicle;
    said throttle pedal rotatable by contact with a foot of a driver of said motor vehicle to regulate power output of an engine of said motor vehicle, between an idle power output to a full throttle output;
    said throttle pedal slideable on said rail toward a front of said vehicle, from a first position closest to said driver, to a second position distanced further from said driver than said first position;
    a brake control actuable to brake of said motor vehicle;
    said brake control actuable in a first mode by depression of a brake pedal situated adjacent said throttle pedal; and
    said brake control actuable in a second mode by a contact of a leading edge of said throttle petal with a brake cage connected to said brake control upon a sliding of said throttle pedal on said rail to said second position, whereby a driver sliding said throttle pedal on said rail to said second position will cause a braking of said motor vehicle.

2. The engine speed and braking control system for a motor vehicle of claim 1, additionally comprising:
a throttle safety switch operatively engaged at a first end of said throttle pedal opposite said leading edge; and
said throttle safety switch actuated by said sliding of said throttle pedal on said rail toward said second position to a forward position, to change said power output of an engine of said motor vehicle to said idle power output.

3. The engine speed and braking control system for a motor vehicle of claim 1, additionally comprising:
a throttle safety switch positioned to continuously occupy a position elevated above said support surface, which is spaced further from said support surface than an elevation of said first side of said throttle pedal in either said accelerated and said idle positions;
said throttle safety switch changeable to an activated state by a contact with said foot of said driver therewith;
said throttle safety switch in said activated state changing said power output of said engine to said idle power output; and
said idle power output of said engine continuing until both said throttle control is in said idle position and, said contact with said safety switch by said foot of said driver has ceased.

4. The improved motor vehicle speed and braking control system of claim 2, additionally comprising:
such throttle pedal having a shape which is substantially rectangular;
said throttle pedal shape being a parallelogram having corners angled to the right of a driver positioned therabove, at an angle between 10 to 20 degrees.

5. The improved motor vehicle speed and braking control system of claim 3, additionally comprising:
such throttle pedal having a shape which is substantially rectangular;
said throttle pedal shape being a parallelogram having corners angled to the right of a driver positioned therabove, at an angle between 10 to 20 degrees.

6. The forwardly oriented speed and braking control system for a motor vehicle of claim 2, additionally comprising:
said forward position being a sliding distance of least one inch toward said second position from said first position; and
a sliding of said throttle pedal to said first position from said forward position causing said braking to cease and allowing movement of said throttle pedal to regulate said power output by said engine between said idle power output and a full throttle output.

7. The improved motor vehicle speed and braking control system of claim 2, wherein said safety switch is an electronic sensor communicating an electronic signal to a computing device running software thereon configured to actuate an said immediate reduction state of said power output of said engine to that of said idle position.

8. The forwardly oriented speed and braking control system for a motor vehicle of claim 3, wherein said safety switch is an electronic sensor communicating an electronic signal to a computing device running software thereon configured to actuate an said immediate reduction state of said power output of said engine to that of said idle position.

\* \* \* \* \*